Aug. 11, 1936.                E. L. HOFFMAN                 2,050,324
                                CABIN CHUTE
                              Filed June 6, 1933              3 Sheets-Sheet 1
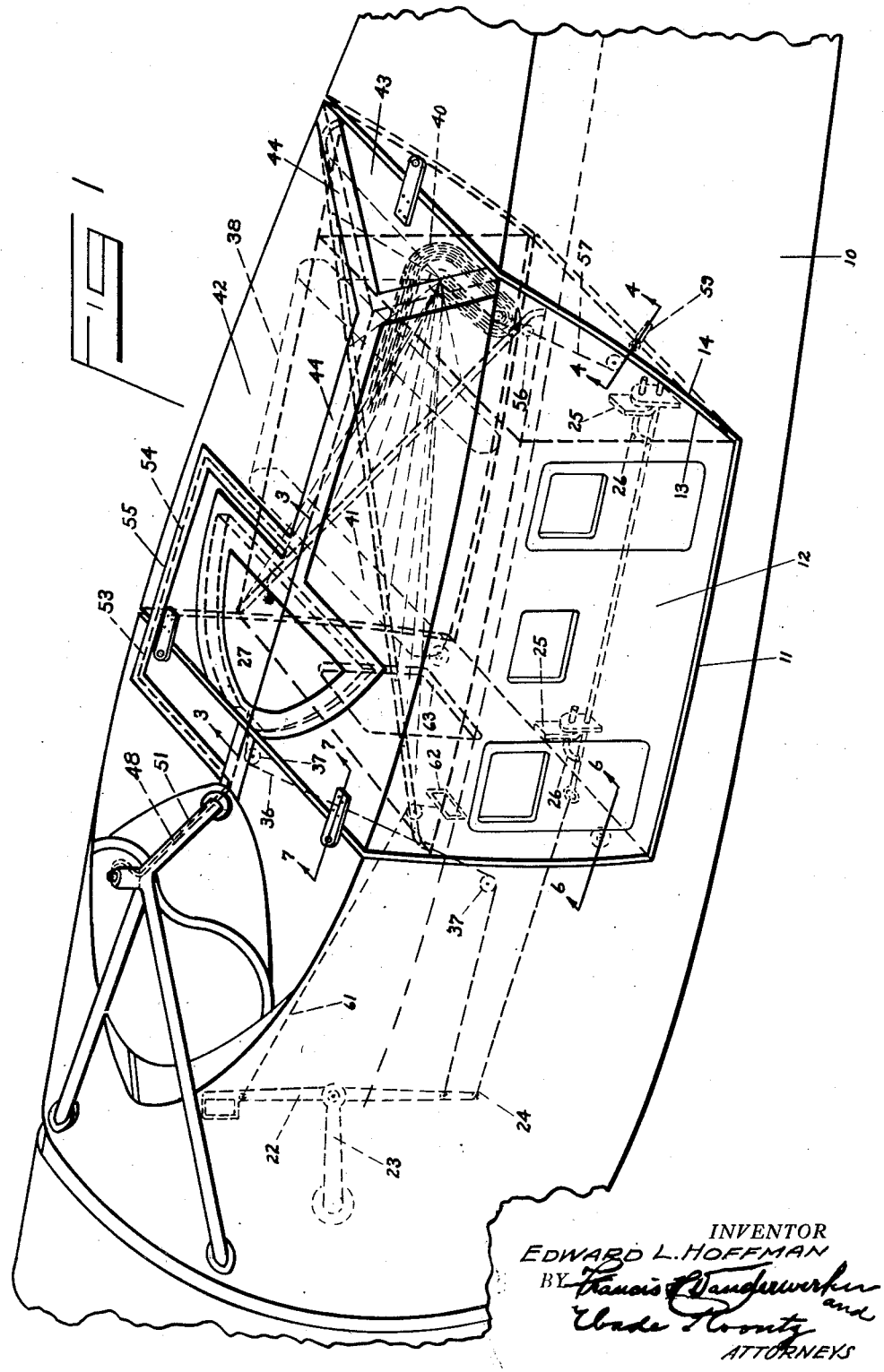
INVENTOR
EDWARD L. HOFFMAN
BY
                    ATTORNEYS Aug. 11, 1936.   E. L. HOFFMAN   2,050,324
CABIN CHUTE
Filed June 6, 1933   3 Sheets-Sheet 2
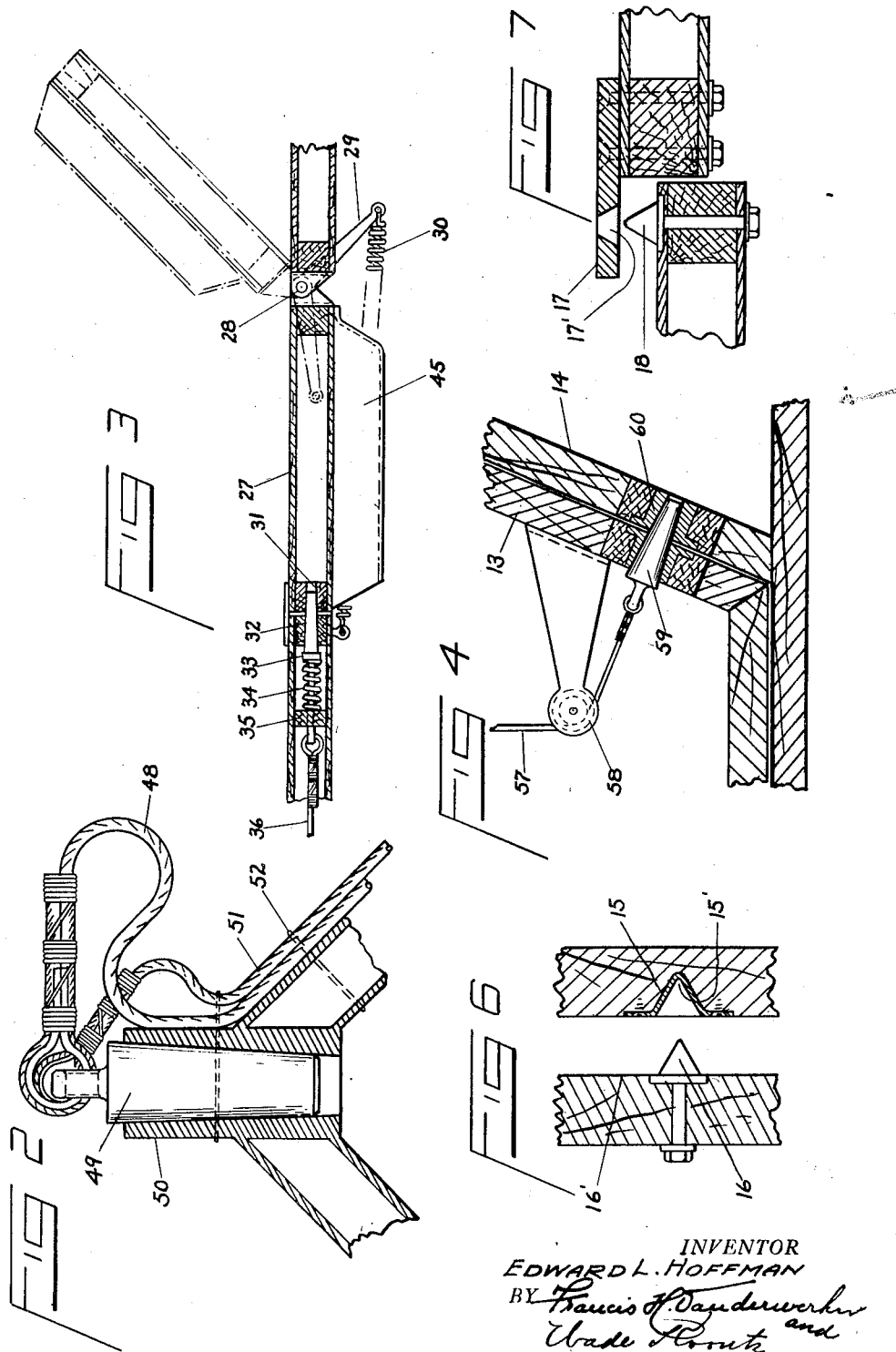
INVENTOR
EDWARD L. HOFFMAN
BY
ATTORNEYS Aug. 11, 1936.　　　E. L. HOFFMAN　　　2,050,324
CABIN CHUTE
Filed June 6, 1933　　　3 Sheets-Sheet 3
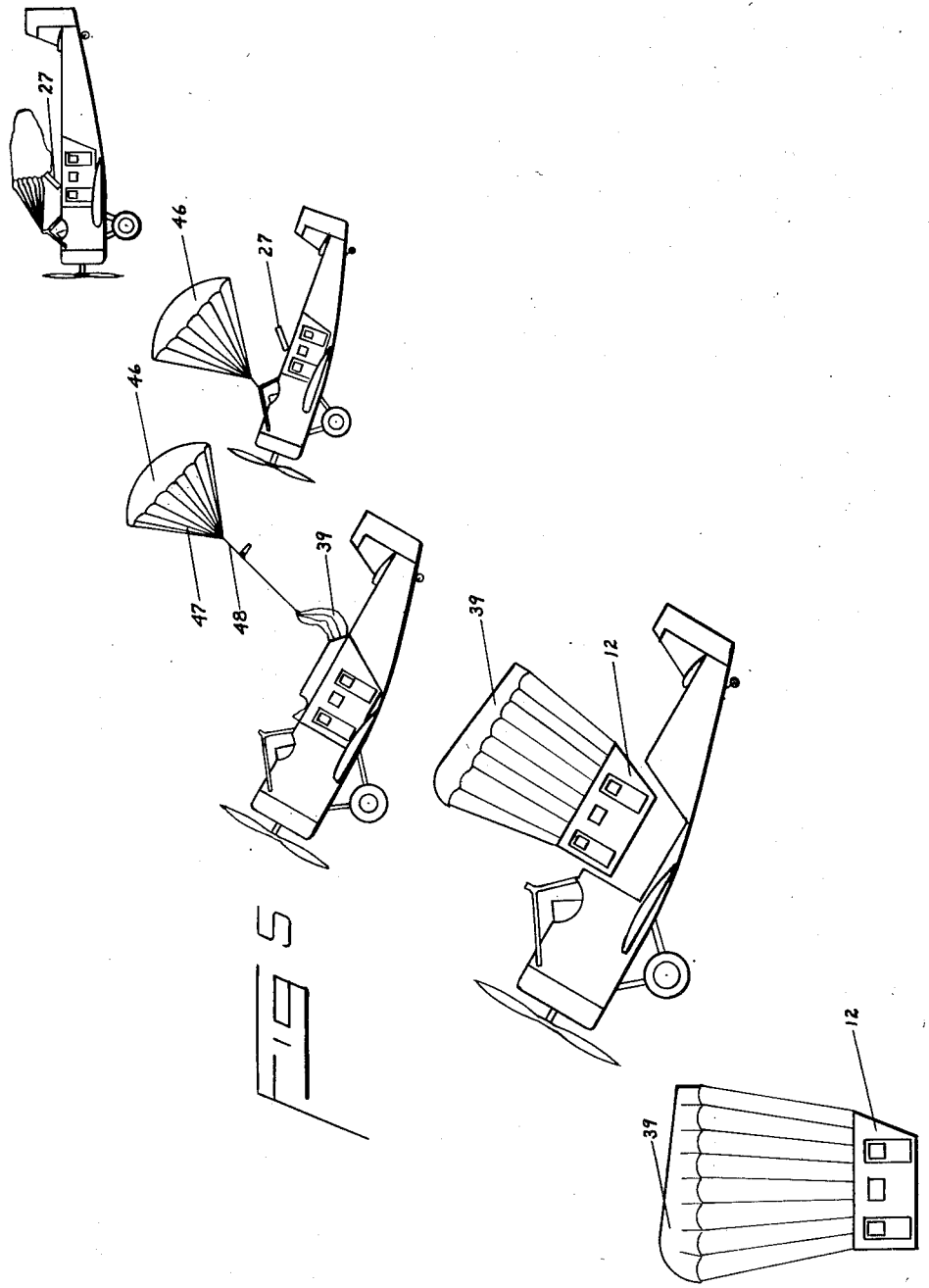
INVENTOR
EDWARD L. HOFFMAN
BY
ATTORNEYS Patented Aug. 11, 1936

2,050,324

UNITED STATES PATENT OFFICE 2,050,324

CABIN CHUTE

Edward L. Hoffman, Dayton, Ohio

Application June 6, 1933, Serial No. 674,559

8 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to safety apparatus for airplanes, and has reference to improvements in passenger carrying airplanes, particularly of the cabin type, and in which the occupants of the cabin while in flight may be enabled to descend safely to the ground when circumstances render it necessary or advisable by separating the passenger carrying cabin from the remainder of the airplane.

Many problems from a practical standpoint have apparently been overlooked in parachute apparatus used in the past, especially in those cases in which the cabin is dragged clear of the fuselage. Among others are the fact that a parachute sufficiently large to safely lower a cabin to the ground may be carried on the airplane in certain locations only. It is obvious that it cannot be carried near the tail, nor can it be carried out near the wing tip. To obtain the desired results, namely, safety to the occupants of the cabin, it therefore is essential that the apparatus be carried as close to the center of gravity of the airplane as possible. This leaves only the following locations from which to choose, either the center section of the wings or the central portion of the fuselage.

Another important fact which has been overlooked in apparatus used in the past is the fact that any relatively light object such as a parachute when released from an airplane, does not rise or soar as is the popular belief; rather, it goes straight to the rear, parallel to the line of flight at the moment of release. Actually, the parachute does not go back, but on the other hand, it is the plane that is moving forwardly, but it seems to and what we are only visualizing is the relative motion between the parachute and the airplane. Bearing this in mind, therefore, it will necessarily follow that from the point of release of the parachute directly to the rear of the airplane, there must be nothing on which the parachute can catch or foul. Since the storage location of the main parachute is limited to the spaces mentioned, it is obvious that the following obstruction must be considered in connection with fouling, namely, the horizontal stabilizer with elevators, the vertical fin, rudder, tail skid, and the brace wires or struts for supporting these parts.

The primary object of the present invention, therefore, is to provide a means for releasing the cabin from the remainder of the airplane which is operable with certainty at any altitude both at high and low speeds.

A further object of the present invention is to provide in an apparatus of this character a so-called decelerator-pilot parachute, which is connected to the main parachute in a manner such that the release of the main parachute will only be obtained when the airplane is in a certain predetermined attitude.

A further object of the present invention is to provide in an apparatus of this character, a decelerator-pilot parachute adapted to perform a dual function, in that it first tends to pull up the nose of the airplane and slow up the ship making gravity absorb its kinetic energy, or if the airplane is in a dive, to bring it out of the dive, thus permitting a release of the cabin at low attitude and after performing these functions, to act as a pilot parachute and launch the main parachute only when a desired angular relation exists between the longitudinal axis of the airplane and the decelerator parachute.

A still further object of the present invention is to provide in an apparatus of this character, a cabane mast positioned forwardly of the cabin and means for releasably connecting the decelerator pilot parachute to the mast in a manner such as to be releasable only when a predetermined angular relation exists between the longitudinal axis of the airplane and the decelerator chute. The cabane mast is located sufficiently distant from the tail surfaces of the airplane that as long as the angle between the decelerating chute and the longitudinal axis of the airplane is less than the desired angle, it is impossible for the decelerator chute to become entangled in the tail surfaces of the airplane. When, however, the angle between the decelerator chute and the longitudinal axis of the airplane is at the desired angle, the decelerator chute will be released and thereafter effect a launching of the main chute. Consequently, at the instance of its release, the tail surfaces of the airplane will be sufficiently below the main parachute as to eliminate the possibility of the main parachute and decelerator chute from becoming entangled in the tail surfaces of the airplane.

A still further object of the present invention is to provide in an apparatus of this character a pull-out plug which is adapted to cooperate with the cabane mast in such a manner that it will be frictionally engaged in the socket of the cabane mast until the decelerator chute and the longitudinal axis of the airplane are at the predetermined angle.

With the above objects in view, the invention resides in the novel combination and arrangement of parts hereafter more fully described with reference to the accompanying drawings wherein:

Fig. 1 is a view in perspective of one embodiment of my invention.

Fig. 2 is an enlarged detail view partly in cross section of the socket portion of the cabane mast and pull-out plug.

Fig. 3 is a sectional view taken on the line 3—3 of Fig. 1.

Fig. 4 is a sectional view taken on the line 4—4 of Fig. 1.

Fig. 5 comprises a series of diagrams illustrating the various phases of action of an airplane or the like equipped with my invention.

Fig. 6 is a sectional view in exploded position taken on the line 6—6 of Fig. 1.

Fig. 7 is a sectional view in exploded position taken on the line 7—7 of Fig. 1.

Referring more particularly to the drawings wherein corresponding parts are designated by like numerals throughout the several views thereof, one embodiment of my invention is illustrated in connection with a cabin type airplane in which the numeral 10 generally indicates the fuselage structure of the airplane, which is provided with a pocket 11 adapted to accommodate the passenger cabin 12. The cabin 12 is carried as a separate unit of the airplane; that is to say, it is so designed as to snugly fit in the pocket 11 heretofore mentioned, and is provided with an inclined ramp indicated by the numeral 13, which cooperates with a correspondingly inclined ramp 14 formed rearwardly of the pocket 11 of the fuselage structure so that when, as will be presently explained, the cabin is dragged clear of the fuselage, friction between the cabin and fuselage will be reduced. It is essential that the cabin be positioned with its center of gravity coincident with the center of gravity of the remainder of the fuselage structure.

As will be noted, by referring to Fig. 6, the lower portion of the forward wall of the cabin is provided with a plurality of adapters 15 each having a tapering socket portion 15' adapted for receiving the cone shaped centering plugs 16 which are secured to the forward upright portions 16' of the pocket 11 so as to prevent lateral movement of the cabin with respect to the fuselage of the aircraft. In a similar manner the top of the cabin has secured thereto a plurality of outwardly extending longitudinally disposed strips 17 each having an opening 17' for receiving the tapered portions of the centering lugs 18 therein. In this manner the cabin is securely cradled in the fuselage.

In this embodiment of the invention, the pilot's compartment is located forwardly of the cabin. Conveniently mounted therein I provide a manually operated release lever indicated by the numeral 22 which is pivotally mounted on a support 23 fixedly secured at its one end to the fuselage structure. The lower end of the lever 23 has secured thereto a release cable generally indicated by the numeral 24. As shown in Fig. 1, the bottom of the cabin 12 has secured thereto a plurality of brackets 25 provided with vertical extensions or hanger arms having openings for accommodating the ends of stay bolts 26 which are secured to the release cable 24 at spaced intervals.

The forward portion of the roof of the cabin 12 is provided with a spring actuated trap door 27 which is hinged rearwardly on a laterally extending shaft 28 mounted in the top of the cabin. The central hinge of the trap door 27 is provided with a depending lever 29 which has attached thereto one end of a coil spring 30 which is secured at its forward end to the top of the cabin as shown in Fig. 1. At its forward end the trap door is provided with an opening 31 within which is adapted to be received a locking plunger 32. This locking plunger is formed with a flanged portion 33 intermediate its ends against which the one end of a spring 34 is adapted normally to bear under compression. The rear end of the spring 34 is adapted to bear under compression against a cross plate 35 on the fuselage structure, thus the plunger 32 is normally maintained in locking position with respect to the trap door. The rear end of this locking plunger has attached thereto a cable 36 which is adapted to pass over a plurality of pulleys generally indicated by numeral 37, the other end of the cable 36 being connected to the lower end of the release lever 22 heretofore mentioned.

Rearwardly of the trap door 27, heretofore mentioned, the top of the cabin 12 is formed with a compartment 38 for receiving the main parachute 39 and the shroud lines thereof, which are connected to the top of the cabin. In folded position of the main parachute, the shroud lines 40 are positioned directly beneath the canopy of the main parachute in an orderly fashion as illustrated in Fig. 1.

The top of the cabin is provided with a weather-proof covering for enclosing the main parachute when in a packed condition. To this end side flaps 41 and 42 are provided which are fixedly secured along the side of the cabin as shown in Fig. 1. An end flap 43 which in this instance is shown as being of triangular shape is adapted to be joined to the side flap heretofore mentioned. For the purposes of this invention, the side flap 43 and the end flaps 41 and 42 may be secured together through the medium of stripping pieces 44 which are lightly cemented in position.

The underneath side of the trap door 27, heretofore mentioned, is provided with a shelf 45 in which the decelerator chute 46 is adapted to be stored. The numeral 47 indicates the shroud lines of the decelerator chute. These lines are connected together by a static lanyard 48, the one end of which is fixedly secured to a pull-out plug 49 adapted to snugly fit within the socket portion 50 of the cabane mast heretofore mentioned. The pull-out plug 49 has also connected thereto a main line indicated by the numeral 51 which is secured to the apex of the main parachute (not shown). When not in use, the main line 51 and the static lanyard for the decelerator chute may be secured to one of the supports of the cabane mast by frangible cords 52, as shown in Fig. 2. The top of the fuselage forward of the cabin is provided with a groove 53 for receiving the main line for the parachute 39. This groove connects with a similar groove 54 provided on the top of the cabin. A stripping piece 55 may be cemented over these grooves, as shown in Fig. 1, to keep the main line in proper position. As will be noted by referring to Fig. 1, an annular ring 56 is threaded upon the shroud lines of the main parachute which has secured thereto a cable 57 which passes over a pulley 58 carried rearwardly by the cabin. The end of this cable has attached thereto a safety plug 59 which fits within a suitable socket member indicated by the numeral 60 which is carried by the ramp 14 of the fuselage structure.

It will be noted that the release lever 22 has secured thereto an auxiliary cable 61 which extends into the cabin of the airplane. The end of the cable 61 has attached thereto a handle 62. It should also be noted that the cabin is provided with a door 63 through which the pilot of the airplane may pass if necessary from the forward cockpit into the cabin.

The operation of the apparatus is as follows:

Should an emergency arise wherein it would be necessary to release the cabin from the airplane, the pilot moves the lever 22 rearwardly to unlock the cabin from the airplane. Pulling the release lever rearwardly will withdraw the staybolts 26 from the hanger arms 25. At the same time the trap door 27 is released and through the action of the spring 30 is swung rearwardly, thus throwing the decelerator parachute into the air. It should be noted by referring to the right hand diagram of Fig. 5 that the pilot parachute is sufficiently short when inflated that it will not reach and foul within the tail surfaces of the airplane. At the instant of its release, the decelerator parachute is aligned parallel with respect to the longitudinal axis of the plane. At this time it is impossible for the pull-out plug 49 to be withdrawn from the socket of the cabane mast by reason of its frictional engagement with the side of the socket. Under these conditions the effect of the decelerator chute will be to pull the airplane into a climbing attitude as shown in Fig. 5. When the decelerator parachute has reached approximately an angle of thirty degrees with respect to the longitudinal axis of the airplane, the pull exerted by the decelerator parachute will automatically withdraw the pull-out plug from its socket. At this instant, the stripping pieces 55 and 44 are torn from the airplane, the side flaps 41 and 42 and end flap 43 are freed and the main parachute will be withdrawn from its compartment, it being understood that at this time or during this interval of time the decelerator parachute will be serving the purpose of a conventional pilot parachute. With the airplane in a climbing attitude, sufficient clearance will exist between the tail surfaces of the airplane and the pilot parachute such that any tendency of the pilot parachute or main parachute to become fouled in the tail surfaces of the airplane will be avoided. As the shroud lines of the main parachute begin to take hold, the cable 57 is actuated to release the plug 59 from its socket and permit the cabin to be dragged clear of the fuselage of the airplane in a manner shown in Fig. 5.

Any conventional type of sustaining parachute may be used but in the preferred embodiment herein illustrated, I prefer to use a parachute constructed in accordance with that set forth in my patent, No. 1,780,190, issued November 4, 1930. This type of parachute is exceedingly stable in its descent through the air and is so constructed as to eliminate objectionable oscillations and thereby give added comfort to the occupants of the cabin during the descent to the ground.

While I have illustrated and described the preferred form of construction for carrying my invention into effect, it is to be understood that variations and modifications may be had without departing from the spirit of my invention.

I, therefore, do not wish to be limited to the precise details of construction set forth but desire to avail myself of such variations and modifications as come within the scope of the appended claims.

I claim:

1. In an aircraft, the combination with the fuselage, of a detachable cabin having an auxiliary parachute and a main parachute operatively connected with each other and with said cabin, means for first ejecting said auxiliary parachute into the airstream incidental to the line of flight of said aircraft, separable coupling means between said auxiliary parachute and the fuselage of said aircraft, the point of attachment of which is disposed forwardly of the center of gravity of said aircraft whereby upon release of said auxiliary parachute said aircraft is tilted into a stalling attitude, said coupling means comprising separable members arranged to be separated only when said aircraft has been moved into a predetermined stalling attitude.

2. In an aircraft, the combination with the fuselage, of a detachable cabin having an auxiliary parachute and a main parachute operatively connected with each other and with said cabin, means for ejecting said auxiliary parachute into the airstream incidental to the line of flight of said aircraft and for simultaneously disconnecting said cabin from said fuselage, separable coupling means between said auxiliary parachute and the fuselage of said aircraft, the point of attachment of said coupling means being disposed forwardly of the center of gravity of said aircraft whereby upon release of said auxiliary parachute said aircraft is tilted into a stalling attitude by the pulling force of said auxiliary parachute, said coupling means comprising separable members arranged to be uncoupled only when the angle between the path of pull of said auxiliary parachute and the path of said aircraft is equal to or greater than a predetermined angle.

3. In an aircraft, the combination with the fuselage, of a detachable cabin whose center of mass is substantially coincident with the center of gravity of said aircraft, an auxiliary parachute and a main parachute operatively connected with each other and with said cabin, a cabane mast mounted on said fuselage forwardly of said cabin, means for ejecting said auxiliary parachute into the airstream incidental to the line of flight of said aircraft and for simultaneously disconnecting said cabin from said fuselage, separable means for coupling said auxiliary parachute to the apex of said cabane mast whereby, upon being released, said auxiliary parachute first exerts a pulling force tending to tilt said aircraft into a stalling attitude, said coupling means comprising separable members arranged to be separated and thereby free said auxiliary parachute from said cabane mast only when the path of pull of said auxiliary parachute and the path of separation of said members are disposed at least at a predetermined angle.

4. In an aircraft, the combination with the fuselage, of a detachable cabin whose center of mass is substantially coincident with the center of gravity of said aircraft, an auxiliary parachute and a main parachute operatively connected with each other and with said cabin, a cabane mast mounted on said fuselage forwardly of said cabin, manually operable means for ejecting said auxiliary parachute into the airstream incidental to the line of flight of said aircraft and for simultaneously disconnecting said cabin from said fuselage, and a self-detaching device normally coupling said auxiliary parachute to the apex of said cabane mast whereby, upon being released, said auxiliary parachute first exerts a pulling force tending to move said aircraft into a stalling attitude, said device comprising separable members arranged to be automatically separated and thereby free said auxiliary parachute from said cabane mast only when the path of pull of said auxiliary parachute and the path of separation of said separable members are disposed at least at a predetermined angle.

5. In an aircraft, the combination with the fuselage, of a detachable cabin whose center of mass is substantially coincident with the center of gravity of said aircraft, an auxiliary parachute and a main parachute operatively connected with each other and with said cabin, a cabane mast mounted on said fuselage forwardly of said cabin and having an upstanding socket portion, manually operable means for disconnecting said cabin from said fuselage, spring controlled means simultaneously actuated by operation of said manual means for forcibly ejecting said auxiliary parachute into the airstream incidental to the line of flight of said aircraft, and a pull-out plug normally frictionally engaged in the socket portion of said cabane mast for releasably coupling said auxiliary parachute to said cabane mast whereby said auxiliary parachute, upon being released, first exerts a pulling force tending to move said aircraft into a stalling attitude, said plug being arranged to be separated from said socket portion only when the magnitude and direction of the pulling force of said auxiliary parachute is sufficient to overcome the inherent friction between said plug and said socket portion.

6. In an aircraft, the combination with the fuselage, of a detachable cabin whose center of mass is substantially coincident with the center of gravity of said aircraft, an auxiliary parachute and a main parachute operatively connected with each other and with said cabin, a cabane mast mounted on said fuselage forwardly of said cabin and having an upstanding outwardly tapering socket portion, manually operable means for disconnecting said cabin from said fuselage, spring controlling means simultaneously actuated by operation of said manual means for forcibly ejecting said auxiliary parachute into the air-stream incidental to the line of flight of said aircraft, and a tapered pull-out plug normally frictionally engaged in the socket portion of said cabane mast for releasably coupling said auxiliary parachute to said cabane mast whereby said auxiliary parachute, upon being released, first exerts a pulling force tending to move said aircraft into a stalling attitude, said plug being arranged to be separated from said socket portion only when the magnitude and direction of the pulling force of said auxiliary parachute is sufficient to overcome the inherent friction between said plug and said socket portion.

7. In an aircraft, the combination with the fuselage, of a detachable passenger-carrying cabin whose center of mass is substantially coincident with the center of gravity of said aircraft, an auxiliary parachute and a main parachute operatively connected with each other and with said cabin, a cabane mast mounted on said fuselage forwardly of the center of gravity of said aircraft, an upstanding socket portion carried by said mast at its apex, manually operable means for disconnecting said cabin from said fuselage, a spring controlled trap-door including a supporting member for said auxiliary parachute simultaneously actuated by operation of said manual means for forcibly ejecting said parachute into the airstream incidental to the line of flight of said aircraft, and a pull-out plug normally frictionally engaged in the socket portion of said cabane mast for releasably coupling said auxiliary parachute to said cabane mast whereby said auxiliary parachute, upon being released, first exerts a pulling force tending to move said aircraft into a stalling attitude, said plug being arranged to be separated from said socket portion only when the magnitude and direction of the pulling force of said auxiliary parachute is sufficient to overcome the inherent friction between said plug and said socket portion.

8. The combination in an airplane, as set forth in claim 7, said cabin being characterized in that it includes a storage compartment for said main parachute and a plurality of releasable flaps for enclosing said main parachute adapted to be sealed by stripping pieces, the connection between said auxiliary parachute and main parachute operating to automatically remove said stripping pieces as said main parachute is being launched.

EDWARD L. HOFFMAN.